(12) United States Patent
Ishikawa

(10) Patent No.: US 11,545,064 B2
(45) Date of Patent: Jan. 3, 2023

(54) DISPLAY DEVICE, DISPLAY METHOD, AND NON-TRANSITORY RECORDING MEDIUM

(71) Applicant: Tsuyoshi Ishikawa, Kanagawa (JP)

(72) Inventor: Tsuyoshi Ishikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/445,782

(22) Filed: Aug. 24, 2021

(65) Prior Publication Data

US 2022/0109763 A1 Apr. 7, 2022

(30) Foreign Application Priority Data

Oct. 6, 2020 (JP) .............................. JP2020-169219

(51) Int. Cl.
*G09G 3/20* (2006.01)
*H04N 1/00* (2006.01)

(52) U.S. Cl.
CPC ......... *G09G 3/20* (2013.01); *G09G 2340/045* (2013.01); *G09G 2340/0442* (2013.01); *H04N 1/00416* (2013.01)

(58) Field of Classification Search
CPC .................. H04N 1/00416; G09G 3/20; G09G 2340/0442; G09G 2340/045; G09G 3/02
See application file for complete search history.

(56) References Cited

U.S. PATENT DOCUMENTS

| 2008/0291284 | A1* | 11/2008 | Robsarve | H04N 1/33353 |
| | | | | 348/207.99 |
| 2015/0261418 | A1* | 9/2015 | Heo | G06T 3/40 |
| | | | | 345/661 |
| 2016/0210768 | A1* | 7/2016 | Yoo | G06T 3/40 |
| 2020/0082795 | A1* | 3/2020 | Ano | G09G 3/001 |

FOREIGN PATENT DOCUMENTS

| JP | 2006-285373 | 10/2006 |
| JP | 2016-099832 | 5/2016 |

\* cited by examiner

*Primary Examiner* — Roy P Rabindranath
(74) *Attorney, Agent, or Firm* — IPUSA, PLLC

(57) ABSTRACT

A display device includes circuitry to determine, based on a display data length and a display area length, whether display data including one or more display components fits within a display area of a screen on which the display data is to be displayed. In case that a determination result indicates that a part of the display data is out of the display area, the circuitry displays the display data including the one or more display components that are reduced based on a difference between the display data length and the display area length.

16 Claims, 15 Drawing Sheets

| MAIN COMPONENT NO | NAME | VERTICAL WIDTH | | | DISPLAY POSITION | SUB COMPONENT NO |
|---|---|---|---|---|---|---|
| | | MAXI-MUM | STAN-DARD | MINI-MUM | | |
| U0001 | BUTTON1 | 100 | 80 | 50 | (10, 20) | S0001, S0002, S0003 |
| U0002 | BUTTON2 | 80 | 50 | 30 | (120, 20) | S0004, S0005, S0006 |
| U0003 | BUTTON3 | 130 | 100 | 70 | (10, 150) | S0007, S0008 |
| ... | ... | ... | ... | ... | ... | ... |

| SUB COMPONENT NO | NAME | SIZE | | | RELATIVE POSITION | TYPE | IMAGE FILE PATH | FONT | DISPLAYED TEXT |
|---|---|---|---|---|---|---|---|---|---|
| | | MAXI-MUM | STAN-DARD | MINI-MUM | | | | | |
| S0001 | TEXT A | 30 | 25 | 20 | (15, 20) | TEXT | – | FONT A | AUTO |
| S0002 | IMAGE A | 30 | 25 | 20 | (10, 20) | IMAGE | xxx/abc.jpg | – | – |
| S0003 | TEXT B | 15 | 10 | 5 | (5, 20) | TEXT | – | FONT B | PAPER SELECT |
| ... | ... | ... | ... | ... | ... | ... | ... | ... | ... |

| MAIN COMPONENT NO | NAME | VERTICAL WIDTH | | | DISPLAY POSITION | SUB COMPONENT NO | GROUP NO |
|---|---|---|---|---|---|---|---|
| | | MAXIMUM | STANDARD | MINIMUM | | | |
| U0001 | BUTTON1 | 100 | 80 | 50 | (10, 20) | S0001, S0002, S0003 | 1 |
| U0002 | BUTTON2 | 80 | 50 | 30 | (120, 20) | S0004, S0005, S0006 | 1 |
| U0003 | BUTTON3 | 130 | 100 | 70 | (10, 150) | S0007, S0008 | 2 |
| ... | ... | ... | ... | ... | ... | ... | ... |

| SUB COMPONENT NO | NAME | SIZE | | | RELATIVE POSITION | TYPE | IMAGE FILE PATH | FONT | DISPLAYED TEXT |
|---|---|---|---|---|---|---|---|---|---|
| | | MAXIMUM | STANDARD | MINIMUM | | | | | |
| S0001 | TEXT A | 30 | 25 | 20 | (15, 20) | TEXT | - | FONT A | AUTO |
| S0002 | IMAGE A | 30 | 25 | 20 | (10, 20) | IMAGE | xxx/abc.jpg | - | - |
| S0003 | TEXT B | 15 | 10 | 5 | (5, 20) | TEXT | - | FONT B | PAPER SELECT |
| ... | ... | ... | ... | ... | ... | ... | ... | ... | ... |

DISPLAY DEVICE, DISPLAY METHOD, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2020-169219, filed on Oct. 6, 2020, in the Japan Patent Office, the entire disclosure of which is hereby incorporated by reference.

BACKGROUND

Technical Field

Embodiments of the present disclosure relate to a display device, a display method, and a non-transitory recording medium storing instructions for executing a display method.

Related Art

There are known display devices in each of which the number of display components to be displayed on a screen increases or decreases according to a situation, such as a connection status in relation to an external device. There are also known methods each of which is performed by such a display device. For example, in such a display method, the display device displays one or more display components at an edge of a screen in a manner that a part of each of the one or more display components is cut off in case that the number of the display components exceeds the number displayable components due to increment of the number of the display components.

SUMMARY

An embodiment of the present disclosure includes a display device including circuitry to determine, based on a display data length and a display area length, whether display data including one or more display components fits within a display area of a screen on which the display data is to be displayed. In case that a determination result indicates that a part of the display data is out of the display area, the circuitry displays the display data including the one or more display components that are reduced based on a difference between the display data length and the display area length.

Another embodiment of the present disclosure includes a display method including displaying display data including one or more display components that are reduced based on a difference between a display data length and a display area length, in response to the display data being out of the display area.

Another embodiment of the present disclosure includes a non-transitory recording medium storing a plurality of instructions which, when executed by one or more processors, causes the processors to perform a method including displaying display data including one or more display components that are reduced based on a difference between a display data length and a display area length, in response to the display data being out of the display area.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 4A and FIG. 4B are diagrams each illustrating an example of display component information according to according to one or more embodiments;

FIG. 11A and FIG. 11B are diagrams each illustrating another example of display component information according to according to one or more embodiments;

Figure 1:
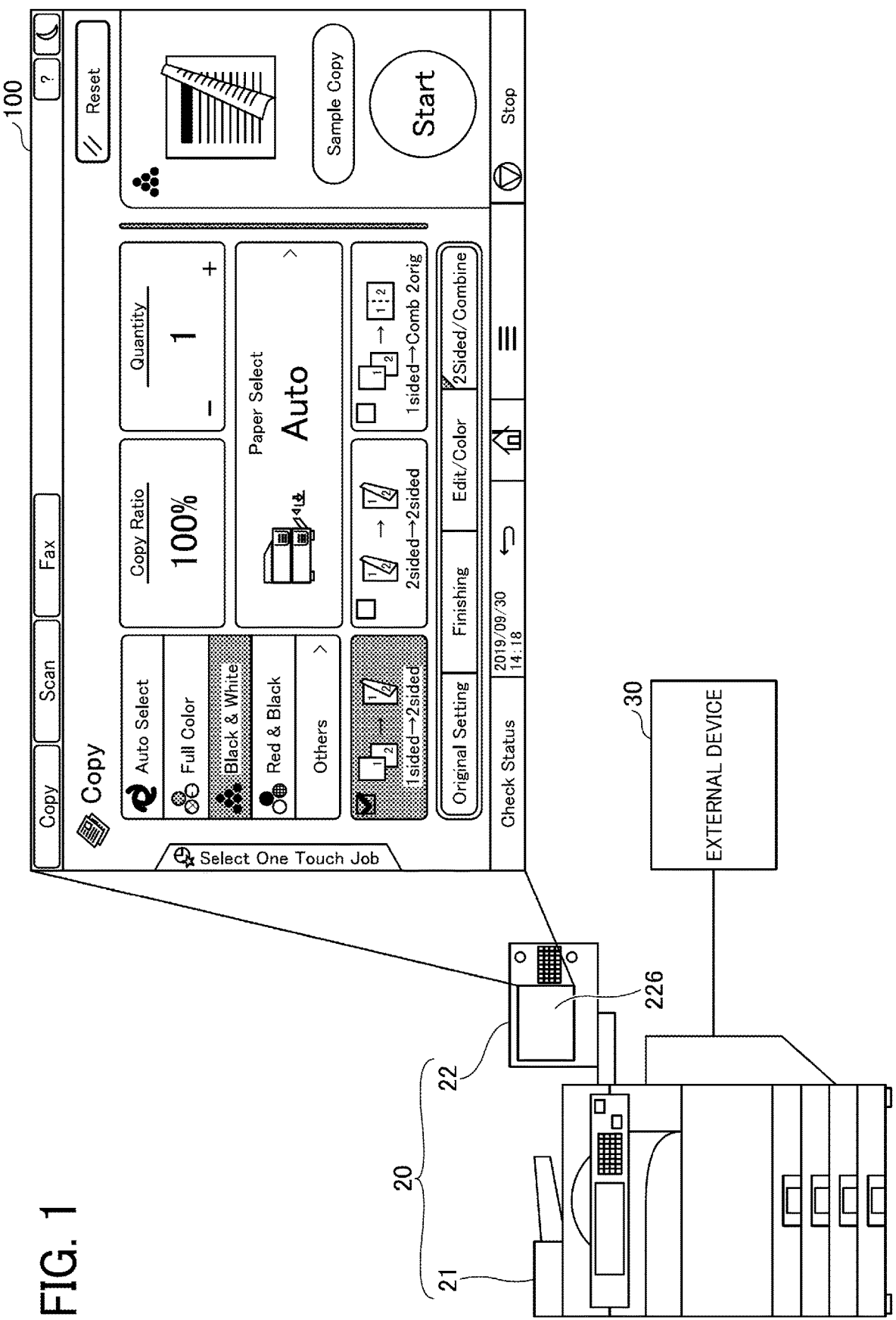
FIG. 1 is an illustration of an overview of an image forming apparatus according to one or more embodiments.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

First Embodiment

Hereinafter, embodiments of an image forming apparatus that is an example of a display device according to the present disclosure are described with reference to the drawings.

FIG. 1 is an illustration of an overview of an image forming apparatus according to an exemplary embodiment.

An image forming apparatus 20 according to the present embodiment includes a main unit 21 and an operation unit 22. An operation panel 226 included in the operation unit 22 displays a screen 100 and receives a user operation, which is an operation performed by a user with respect to a screen displayed on the operation panel 226.

The image forming apparatus 20 further includes an interface for connecting the main unit 21 or the operation unit 22 to an external device 30. The external device 30 is, for example, a peripheral device of a stapler, an Integrated Circuit (IC) card reader, a mobile sensor, or the like. The display components included in the screen 100 change according to a status of a connection (connection status) with respect to the external device 30 and settings set by the user, for example.

Figure 2:
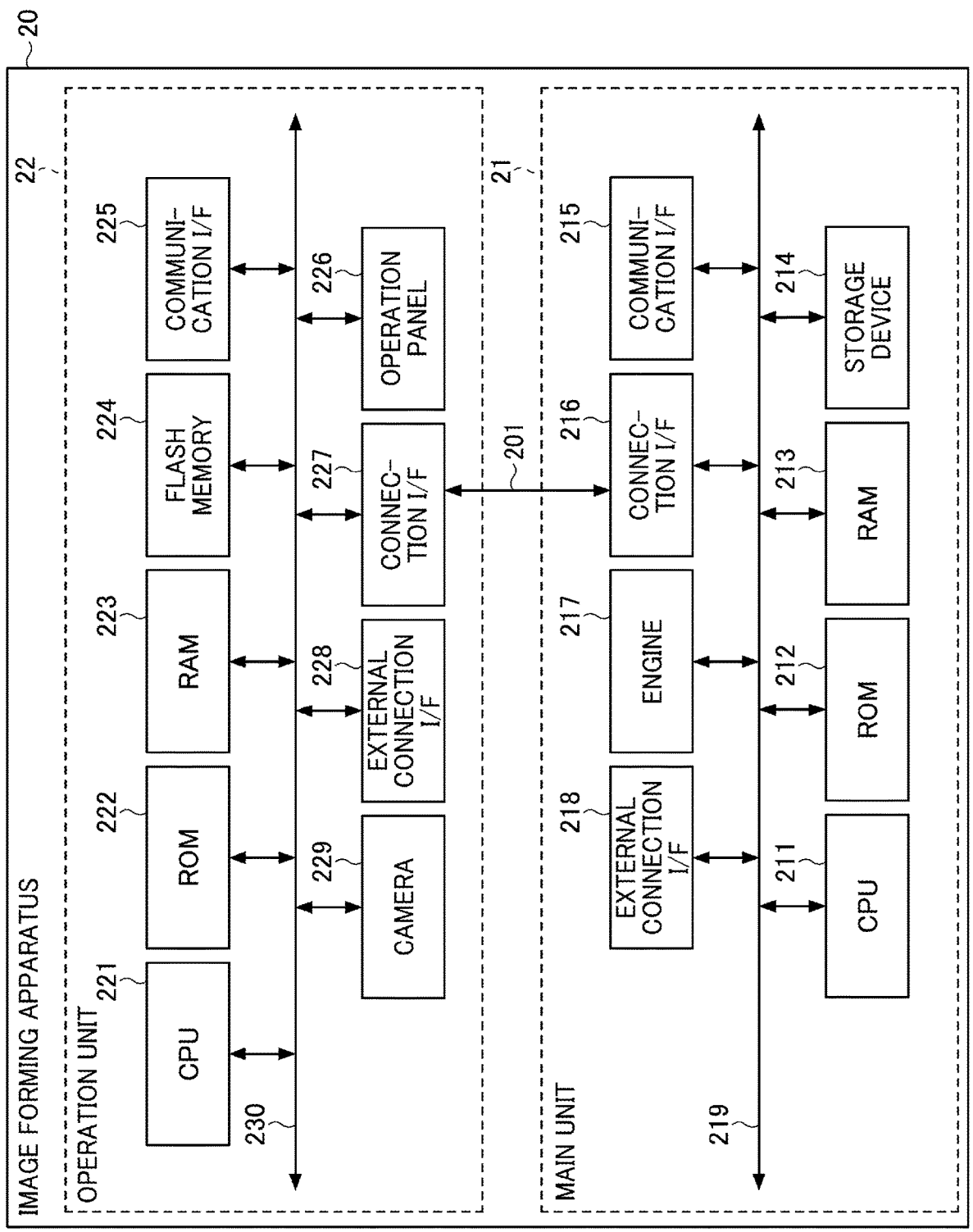
FIG. 2 is a diagram illustrating an example of a hardware configuration of an image forming apparatus according to one or more embodiments.

FIG. 2 is a block diagram illustrating an example of a hardware configuration of an image forming apparatus according to an exemplary embodiment.

The image forming apparatus 20 includes a main unit 21 that implements an image forming function, and the operation unit 22 that receives a user operation. Receiving a user operation means receiving or accepting information or data input according to an operation performed by a user. Such information or data includes a signal indicating a coordinate value on a screen, for example.

The main unit 21 and the operation unit 22 are connected to each other so as to communicate with each other through a communication link 201. The communication link 201 may be in compliance with a Universal Serial Bus (USB) standard, for example. The communication link 201 may be of a standard other than the USB standard regardless of whether the communication link 201 is wired or wireless.

The main unit 21 includes, for example, a Central Processing Unit (CPU) 211, a Read Only Memory (ROM) 212, a Random Access Memory (RAM) 213, a storage device 214, a communication interface (I/F) 215, a connection I/F 216, an engine 217, an external connection I/F 218, and a system bus 219.

The CPU 211 is an arithmetic unit that controls the operation of the entire main unit 21 by executing processing defined in a program stored in the ROM 212 or the storage device 214 or the like with the RAM 213 as a work area. For example, the CPU 211 uses the engine 217 to implement various functions such as a copying function, a scanning function, facsimile communication function, and a printing function.

The ROM 212 is, for example, a non-volatile memory that stores a Basic Input/Output System (BIOS), which is executed when the main unit 21 is started, and various settings. The RAM 213 is a volatile memory used as a work area for the CPU 211. The storage device 214 is, for example, a non-volatile storage device that stores an operating system (OS), an application program, various data, or the like and is implemented by, for example, a hard disk drive or a solid state drive (SSD).

The communication I/F 215 is a network interface such as a wireless local area network (LAN) or a wired LAN for communicating with an external device. The connection I/F 216 is an interface for communicating between the main unit 21 and the operation unit 22 through the communication link 201.

The engine 217 is hardware that performs processing other than general-purpose information processing and communication for implementing functions such as a copying function, a scanning function, a facsimile communication function, and a printing function. The engine 217 includes, for example, a scanner (image reading device) that scans and reads an image of a document, a plotter (image forming device) that prints an image on a sheet material such as paper, and a facsimile device that performs fax communication. The engine 217 may further include optional equipment such as a finisher that sorts printed sheets, and an automatic document feeder (ADF) that automatically feeds documents to be scanned.

The external connection I/F 218 is an interface for connecting a device such as the external device 30 to the main unit 21. The system bus 219 is connected to the above-described components and transmits an address signal, a data signal, various control signals, and the like.

The operation unit 22 is implemented by a computer and includes a CPU 221 and a ROM 222, a RAM 223, a flash memory 224, a communication I/F 225, an operation panel 226, a connection I/F 227, an external connection I/F 228, a camera 229, a system bus 230, and the like.

The CPU 221 controls the operation of the entire operation unit 22 by executing processing defined in a program stored in the ROM 222, the flash memory 224, or the like using the RAM 223 as a work area. The ROM 222 is, for example, a non-volatile memory that stores the BIOS, which is executed when the operation unit 22 is started, and various settings. The RAM 223 is a volatile memory used as a work area for the CPU 221. The flash memory 224 is, for example, a non-volatile storage device that stores an OS, an application program, various data, or the like.

The communication I/F 225 is an interface for connecting the operation unit 22 to the communication network 8 and communicating with an external device. The communication I/F 225 is a network interface such as a wireless LAN or a wired LAN.

The operation panel 226 accepts various inputs according to a user operation and displays various information. The operation panel 226 is implemented by, for example, a liquid crystal display (LCD) equipped with a touch panel function but is not limited to this configuration. The operation panel 226 may be implemented by, for example, an organic electro luminescence (EL) display device equipped with the touch panel function. Further, the operation panel 226 may additionally or alternatively include an operation unit such as a hardware key and a display unit such as a lamp.

The connection I/F 227 is an interface for communication between the main unit 21 and the operation unit 22 through the communication link 201. The external connection I/F 228 is an interface such as a USB for connecting an external device.

The camera 229 is an image capturing device that captures an image of a user. The camera 229 may be installed outside the image forming apparatus 20 and connected to the operation unit 22 through an external connection I/F 228. The system bus 230 is connected to the above-described components and transmits an address signal, a data signal, various control signals, and the like.

Figure 3:
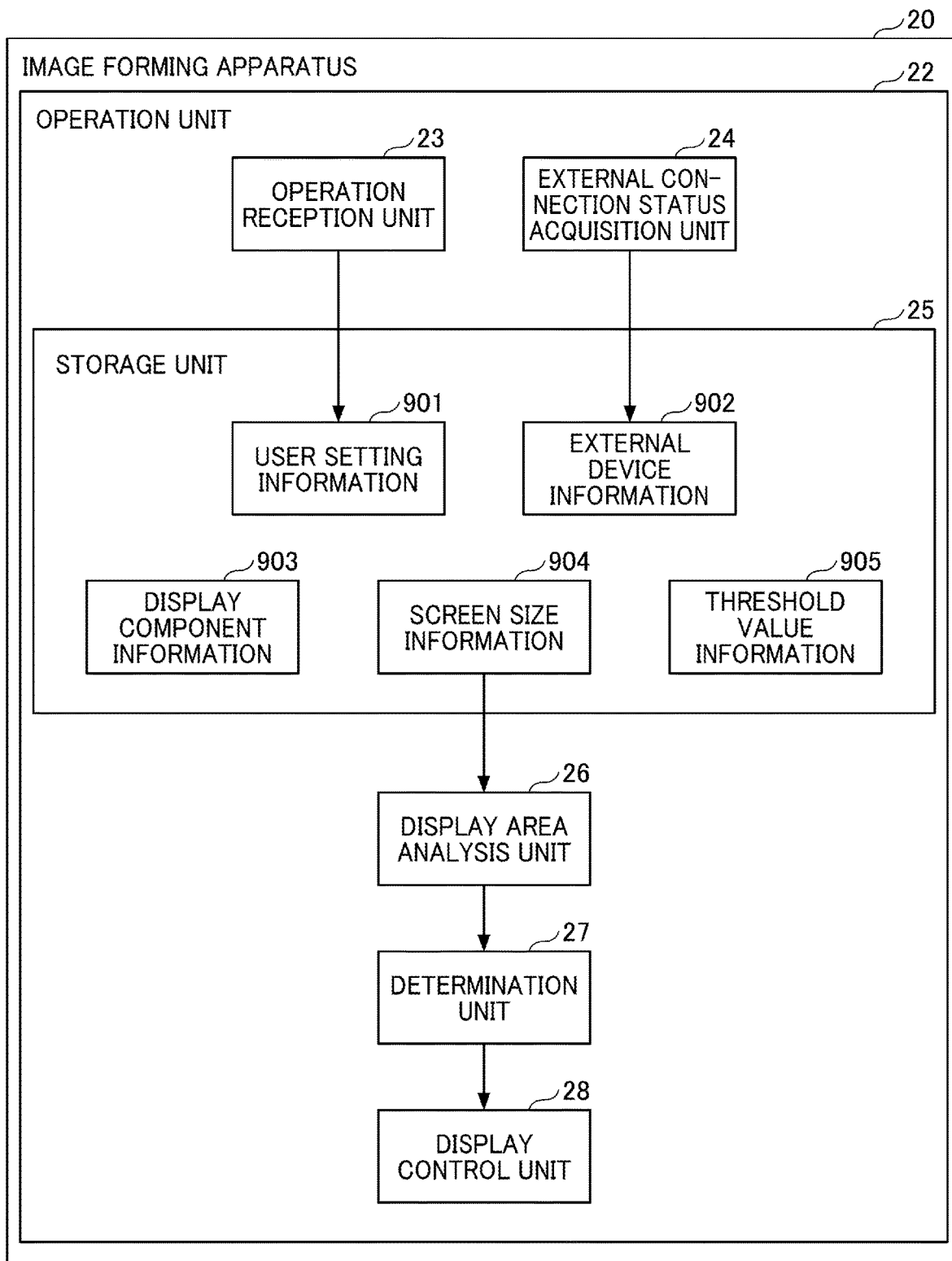
FIG. 3 is a block diagram illustrating an example of a functional configuration of an image forming apparatus according to one or more embodiments.

FIG. 3 is a block diagram illustrating an example of a functional configuration of an image forming apparatus according to an exemplary embodiment.

The operation unit 22 of the image forming apparatus 20 includes, for example, an operation reception unit 23, an external connection status acquisition unit 24, a storage unit 25, a display area analysis unit 26, a determination unit 27, and a display control unit 28.

The operation reception unit 23 receives a user operation, which is an operation performed by a user. Specifically, the operation reception unit 23 receives an operation of changing settings of display components set for an operation screen set for each function, such as a copying function, a scanning function, a printing function, or the like, implemented by the image forming apparatus 20. The operation reception unit 23 stores user setting information 901 indicating changed content, which is received, in the storage unit 25.

The operation reception unit 23 further receives an operation of moving a scroll bar included in the operation screen in a state in which the operation screen is displayed, an operation of selecting a display component resulting in a screen transition, an operation for using one of the various functions, for example.

The operation reception unit 23 is implemented by the CPU 221 controlling the operation panel 226.

The external connection status acquisition unit 24 acquires information indicating a connection status indicating a status of a connection to a device such as the external device 30. Specifically, when the external connection I/F 228 of the operation unit 22 is connected to a device such as the external device 30 through a USB cable, the external connection status acquisition unit 24 acquires, through the USB cable, information indicating a type of the connected device. Then, the external connection status acquisition unit 24 stores external device information 902 that indicates the acquired connection status in the storage unit 25.

The external connection status acquisition unit 24 is implemented by the CPU 221 acquiring information via the external connection I/F 228. The external connection status acquisition unit 24 may acquire information indicating a connection status indicating a status of a connection to a device such as the external device 30 connected to the external connection I/F 218 of the main unit 21. In this case, the external connection status acquisition unit 24 is implemented by the CPU 221 acquiring information via the external connection I/F 228 of the main unit 21.

The storage unit 25 stores various information. More specifically, the storage unit 25 stores the user setting information 901, the external device information 902, display component information 903, screen size information 904, and threshold value information 905.

The display component information 903 is information defining display components included in the display data displayed on the screen 100. The display component information 903 is stored for each function such as a copying function or a scanning function. A detailed discerption of the display component information 903 is given later.

The screen size information 904 is information defining a screen length. The screen length is defined by, for example, a length in a vertical direction (vertical length) and a length in a horizontal direction (horizontal length) of a rectangular shaped area on a basis of a unit of the number of pixels, according to the resolution of the operation panel 226.

The screen size information 904 includes information indicating a display area length. The display area length is also defined by, for example, a vertical length and a horizontal length of a rectangular shaped area on a basis of a unit of the number of pixels. The display area is defined as an area for displaying the display data including one or more display components defined in the display component information 903, on the screen 100. The screen 100 includes the display area and an area other than the display area.

The area other than the display area includes, for example, an image that is not effected by user settings, a connection status related to an external device such as the external device 30. Such an image includes, for example, a display component commonly displayed on the operation screens each of which is corresponding to one of the functions.

The threshold value information 905 is information in which a threshold value used for various processes described later is defined. The threshold value defined in the threshold value information 905 is described later in the description of each process.

The storage unit 25 is implemented by cooperation of the CPU 221, the ROM 222, the RAM 223, and the flash memory 224, for example.

The display area analysis unit 26 analyzes the display data length and the display area length. Specifically, when a function such as a copying function or a scanning function is specified by a user, the display area analysis unit 26 determines one or more display components included in the display data corresponding to the specified function based on the user setting information 901 and the external device information 902. Then, the display area analysis unit 26 calculates to obtain the display data length of the determined display data and the display area length based on the screen size information 904.

The determination unit 27 compares the display data length with the display area length and performs several determination processes, which are described later. More specifically, the determination unit 27 determines whether the display data length is less than the display area by the comparison of the display data length and the display area length. When the display data is not displayed within the display area, namely when the display data is out of the display area, the determination unit 27 determines whether the display data is to be displayed within the display area under the conditions that the one or more display components are reduced (a size of each of the one or more display components are reduced) based on the display component information 903. At this time, the determination unit 27 performs the determination based on information indicating the minimum length of each display component of the one or more display components included in the display component information 903.

The display area analysis unit 26 and the determination unit 27 are implemented by the CPU 221 executing processes defined in a program stored in the ROM 222, the flash memory 224 or the like.

The display control unit 28 displays the display data including the reduced or enlarged display components in the display area according to a determination result obtained by the determination unit 27. More specifically, when the determination unit 27 determines that the display data does not fit within the display area, namely, a part of the display data is not displayed within the display area (a part of the display data is out of the display area), and further determines that the display data fits within the display area under the conditions that each of the one or more display components is reduced, the display control unit 28 displays, within the display area, the display data including the one or more display components that are reduced.

At this time, the display control unit 28 reduces each display component in a manner that a lower limit (minimum limit) is the minimum length defined for the corresponding display component in the display component information 903.

When the determination unit 27 determines that the display data length is less than the display area, the display control unit 28 displays the display data including the one or more display components that are enlarged in the display area. At this time, the display control unit 28 enlarges each display component so that the upper limit is the maximum length defined for the corresponding display component in the display component information 903.

A description is now given of the display component information 903 according to the present embodiment.

FIG. 4A and FIG. 4B are diagrams each illustrating an example of display component information according to the first embodiment.

The display component information 903 includes main component information 903a (see FIG. 4A) and sub component information 903b (see FIG. 4B). That is, the display component includes a main component and a sub component. The main component represents an outer shape of the display component. The sub component represents text or an image that is included in the main component, namely that is to be displayed inside of the outer shape. Each display component includes a single main component and one or more sub components. Note that there may be a display component that includes a single main component without including any sub components.

The main component information 903a includes data items of "MAIN COMPONENT NO," "NAME," "VERTICAL WIDTH," "DISPLAY POSITION," and "SUB COMPONENT NO." The data item of "VERTICAL WIDTH" is subdivided and includes sub data items of "MAXIMUM," "STANDARD," and "MINIMUM."

The value of the data item of "MAIN COMPONENT NO" is an identifier for identifying each main component. Since each display component includes one main component, the value of the data item of "MAIN COMPONENT NO" also functions as an identifier for identifying the corresponding display component.

The value of the data item of "NAME" is a name of each main component.

The value of the data item of "VERTICAL WIDTH" is a value that defines the vertical width of each main component in a basis of units of the number of pixels, for example. The value of the sub data item of "MAXIMUM" is a maximum value of the vertical width. The value of the sub data item of "STANDARD" is a standard value of the vertical width. The value of the item "MINIMUM" is a minimum value of the vertical width.

The standard value of the vertical width indicates a vertical width of the main component on which neither enlargement nor reduction is performed. When enlarging the main component, the display control unit 28 enlarges the main component in the vertical direction, that is, by changing the aspect ratio, within a range not exceeding the maximum value of the vertical width. In addition, when reducing the main component, the display control unit 28 reduces the main component in the vertical direction, that is, by changing the aspect ratio, within a range not less than the minimum value of the vertical width.

The value of the data item of "DISPLAY POSITION" is a value indicating a display position of each main component with respect to the display data. For example, the display position of each main component is indicated by a coordinate value in an X-Y-coordinate system with a point at the upper left corner of the display data as the origin.

The value of the data item of "SUB COMPONENT NO" is an identifier for identifying a sub component included in each main component. The number of sub components included in each main component may be zero, one, or two or more.

The sub component information 903b includes data items of "SUB COMPONENT NO," "NAME," "SIZE," "RELATIVE POSITION," "TYPE," "IMAGE FILE PATH," "FONT," and "DISPLAYED TEXT." The data item of "SIZE" also is subdivided and includes sub data items of "MAXIMUM," "STANDARD," and "MINIMUM."

The value of the data item of "SUB COMPONENT NO" is an identifier for identifying each sub component.

The value of the data item of "NAME" is a name of each sub component.

The value of the data item of "SIZE" is a value indicating a size of each sub component. The value of the data item of "MAXIMUM" is a maximum value of the size of each sub component. The value of the data item of "STANDARD" is a standard value of the size of each sub component. The value of the data item of "MINIMUM" is a minimum value of the size of each sub component.

The standard value of the size is a size of the sub component on which neither enlargement nor reduction is performed. When enlarging the sub component, the display control unit 28 enlarges the sub component within a range not exceeding the maximum value of the size without changing the aspect ratio. In addition, when reducing the sub component, the display control unit 28 reduces the sub component within a range not less than the minimum value of the size without changing the aspect ratio.

The unit of the value indicating the size of each sub component may differs depending on a type of the sub component. The size of the sub component that is a text type is represented by, for example, a Desktop Publishing (DTP) point of the font. In addition, the size of the sub component that is an image type is represented by, for example, the number of pixels of the vertical width of the image.

The value of the data item of "RELATIVE POSITION" is a value indicating a relative position of each sub component with respect to the main component. For example, the relative position of each sub component is indicated by a coordinate value in the X-Y-coordinate system with a point at the upper left corner of the main component as the origin.

The value of the data item of "TYPE" is a value indicating a type of each sub component. For example, the value of the data item of "TYPE" is a value indicating either a text type or an image type.

The value of the data item of "IMAGE FILE PATH" is a value defined for a sub component that is the image type, and is a value indicating a storage location of an image file corresponding to an image of the sub component.

The value of the data item of "FONT" is a value defined for a sub component that is the text type, and is a value indicating a type of characters used in the text.

The value of the data item "DISPLAYED TEXT" is a value defined for a sub component that is the text type, and is a value indicating content represented by the characters used for the text.

Figure 5:
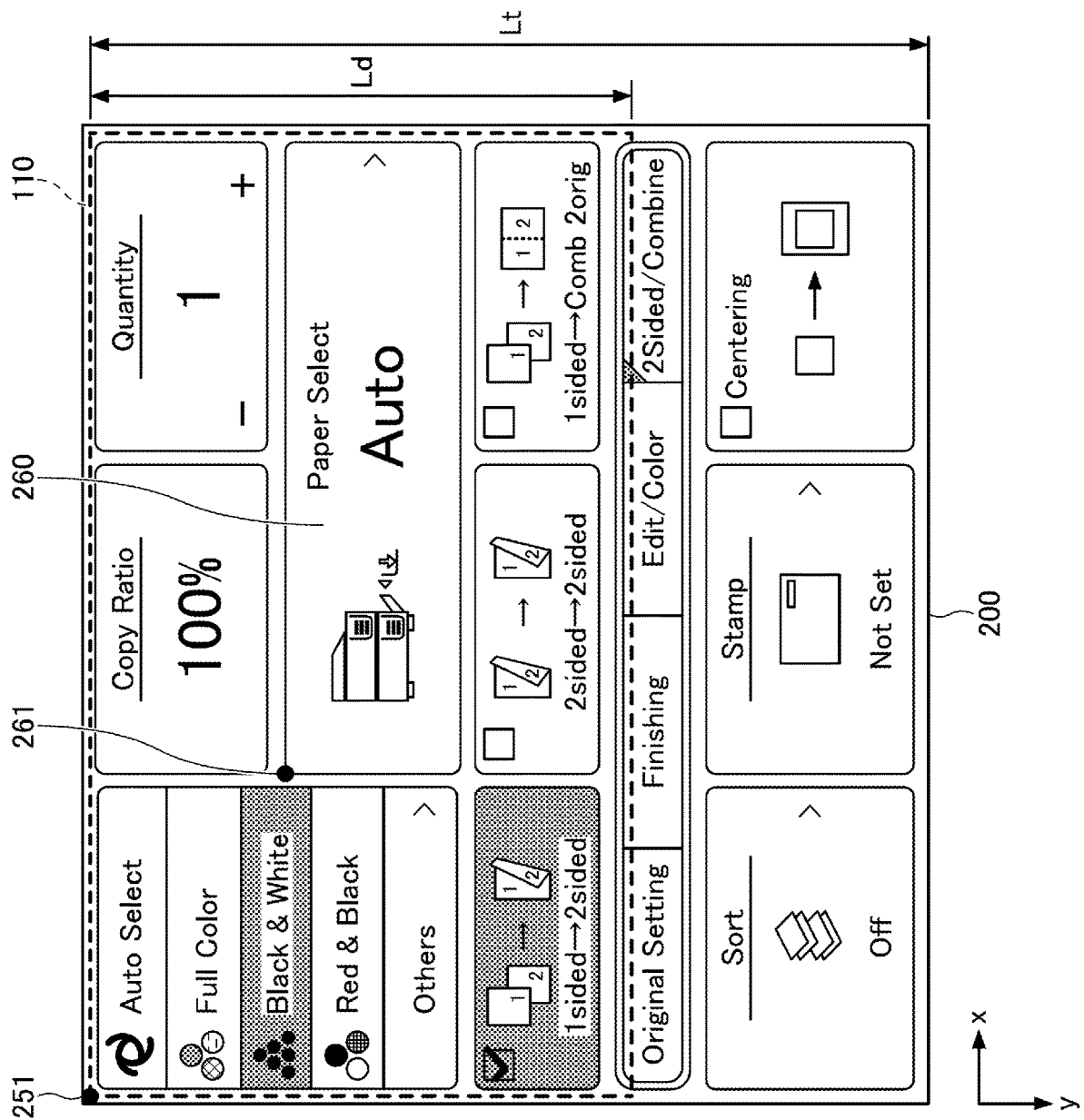
FIG. 5 is a diagram illustrating an example of display data, according to one or more embodiments.

FIG. 5 is a diagram illustrating an example of display data, according to the exemplary embodiment.

Display data 200 includes one or more display components. Each display position of the corresponding display component is determined by the display position of the main component defined in the main component information 903a. For example, the display position of a display component 260 is represented by a coordinate value of an upper left point 261 of the main component included in the display component 260 in the X-Y coordinate system with a point at an upper left point 251 of the display data 200 as the origin.

A vertical width Lt of each display data increases or decreases according to the increase or decrease of the number of display components included in the display data. On the other hand, a vertical width Ld of the display area of the screen 100 is set in advance for each function as the screen size information 904.

Among the display components included in the display data, some of the display components may be reduced or increased according to user setting or a connection status of the external device 30, for example. For example, among the display components included in the display data 200 illustrated in FIG. 5, the display components arranged at the bottom may be reduced or increased according to user settings or a connection status of the external device 30, and the other display components may be always included in the display data.

Figure 6:
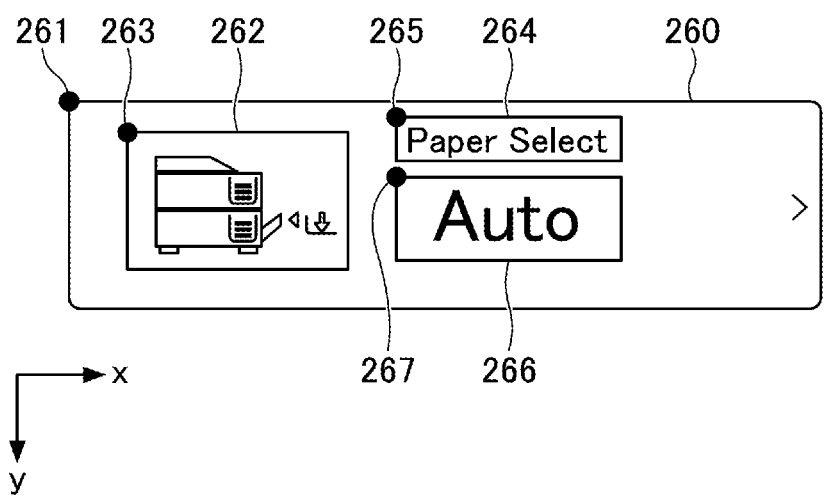
FIG. 6 is a diagram illustrating an example of display component according to one or more embodiments.

FIG. 6 is a diagram illustrating an example of display component according to the exemplary embodiment.

Each display component includes a single main component alone (without a sub component) or a single main component and one or more sub components. For example, the display component 260 illustrated in FIG. 6 includes a main component, a first sub component 262, a second sub component 264, and a third sub component 266.

The relative position of the first sub component 262 is represented by a coordinate value of an upper left point 263 of the first sub component 262 in the X-Y coordinate system with a point at an upper left point 261 of the display component 260 as the origin.

Similarly, the relative position of the second sub component 264 is represented by a coordinate value of a point 265, and the relative position of the third sub component 266 is represented by a coordinate value of a point 267.

Although the example in which the relative position of each sub component is indicated with reference to the upper left point of each sub component is described, other relative positions may be indicated. For example, a relative position of each sub component may be indicated relative to a point at the center of each sub component.

In addition, it is desirable that each display component includes margins on the upper, lower, left, and right sides in order to have a gap between the display component and the adjacent display components.

Figure 7:
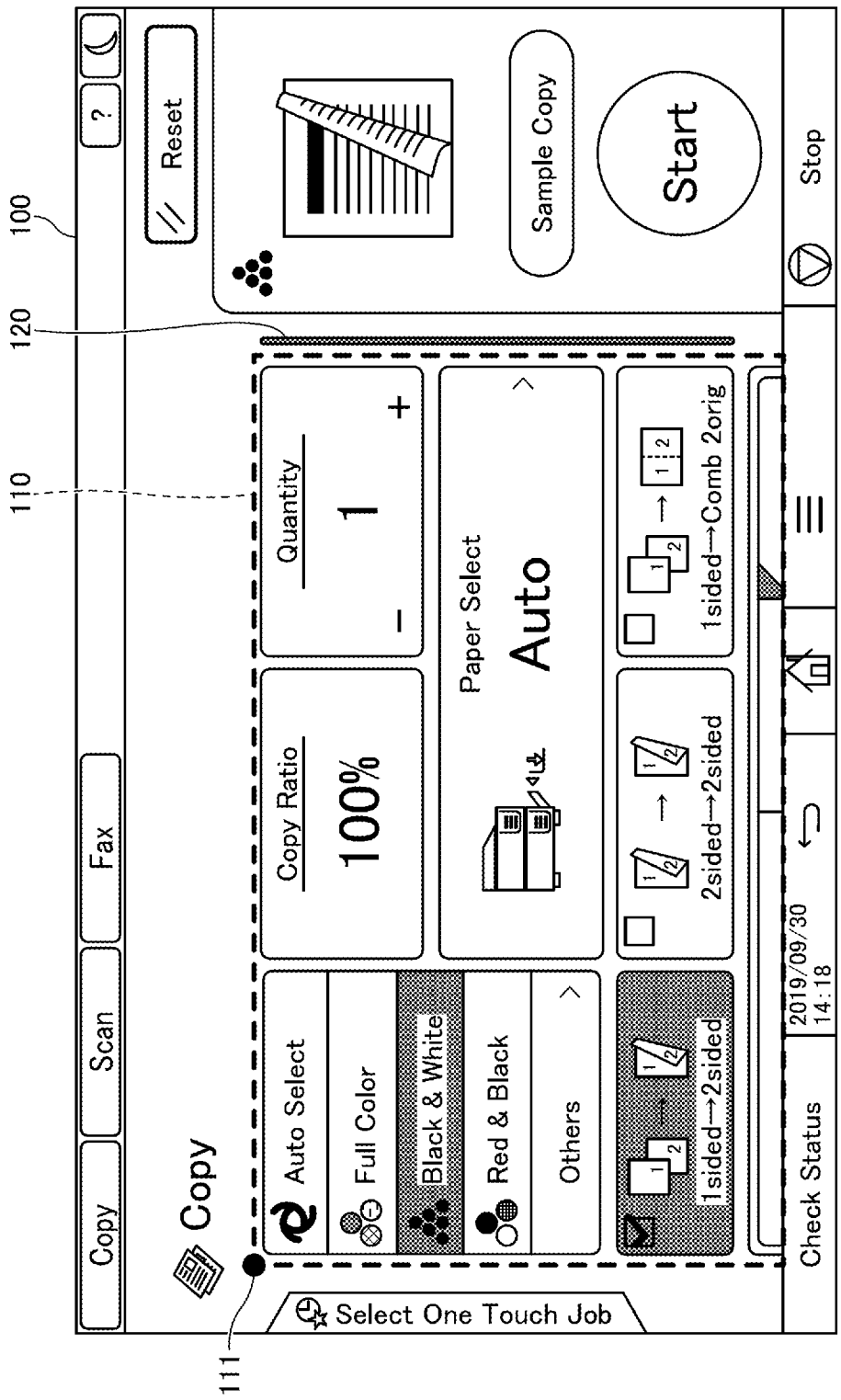
FIG. 7 is a diagram illustrating an example of a screen having a display area according to one or more embodiments.

FIG. 7 is a diagram illustrating an example of a screen having a display area according to the exemplary embodiment.

The screen 100 includes a display area 110. At an initial display of the screen 100, an upper left point 111 of the display area 110 coincides with an upper left point of the display data. When the display data does not fit in the display area 110, namely, when the display data is not displayed within the display area 110, the screen 100 includes a scroll bar 120, namely, the scroll bar 120 is displayed on the screen 100. When a user operation is performed with respect to the scroll bar 120, content displayed in the display area 110 of the display data is changed by sliding in the vertical direction.

A description is given below of operation of the image forming apparatus 20 according to the present embodiment.

The image forming apparatus 20 performs an adjustment process for adjusting display data before the display data is displayed in response to an event that each function such as a copying function or a facsimile function is called.

The image forming apparatus 20 may refer to the user setting information 901 and the external device information 902 and perform the adjustment process when the user setting information 901 or the external device information 902 is changed. More specifically, the image forming apparatus 20 stores information indicating a change history of the user setting information 901 or the external device information 902 in the storage unit 25 and then deletes the change history or records information indicating that the adjustment process has been performed. Accordingly, the image forming apparatus 20 determines whether the adjustment process has been performed after the user setting information 901 or the external device information 902 is changed and then performs the adjustment process when a result of the determination indicates that the adjustment process has not been performed.

Figure 8:
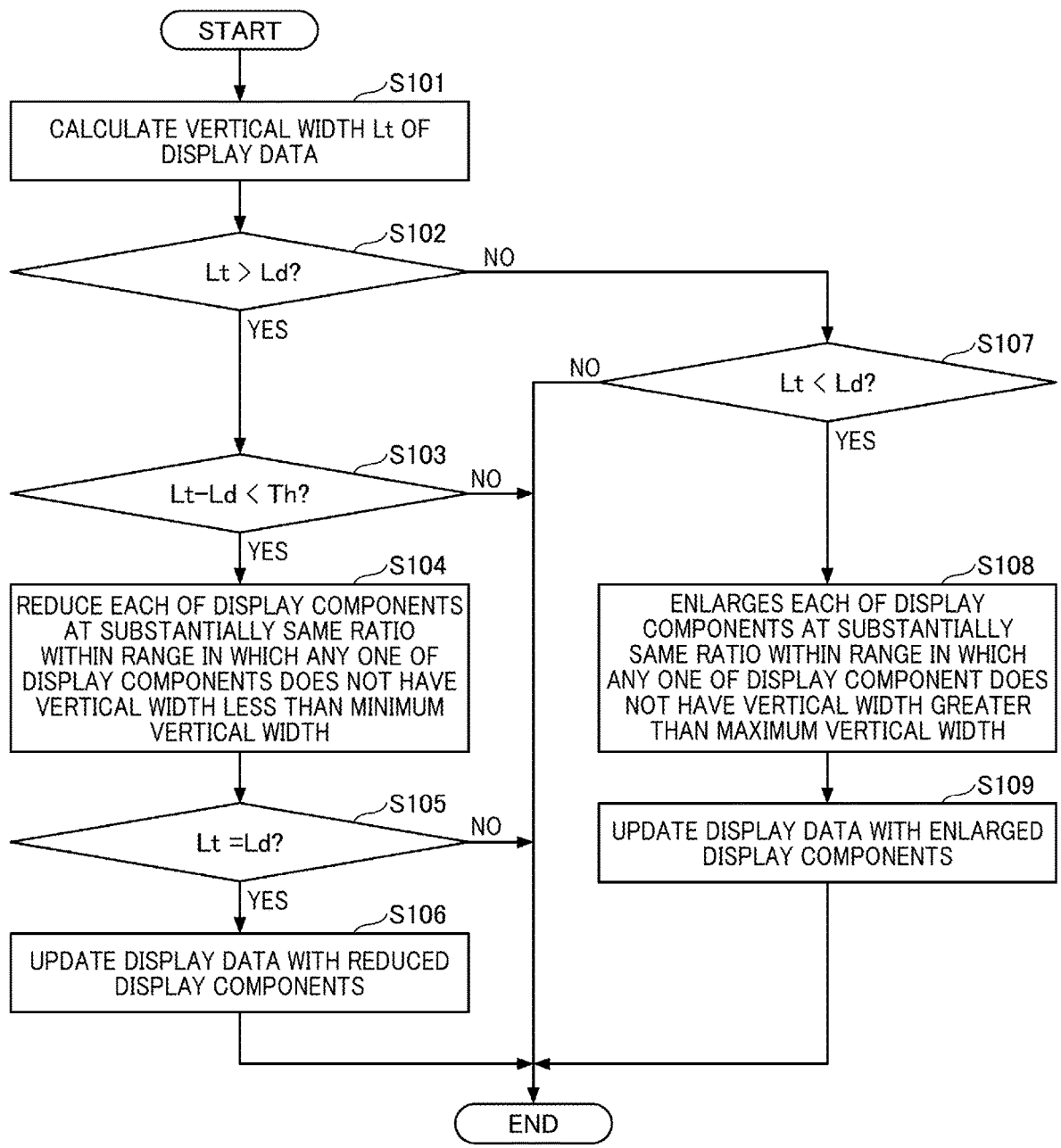
FIG. 8 is a flowchart illustrating an example of an adjustment process according to one or more embodiments.

FIG. 8 is a flowchart illustrating an example of an adjustment process according to the first embodiment.

When the image forming apparatus 20 starts performing the adjustment process, the display area analysis unit 26 calculates the display data length. More specifically, the display area analysis unit 26 refers to the user setting information 901 and the external device information 902 to change the record of the main component information 903a among the display component information 903 defined for each function. For example, when a display component that has "MAIN COMPONENT NO" of "U0002" is set not to be displayed by the user setting, the display area analysis unit 26 deletes the corresponding record from the main component information 903a.

The image forming apparatus 20 may not change the record of the main component information 903a during the adjustment process but may change the record of the main component information 903a at a time when the user setting information 901 or the external device information 902 is changed.

Then, the display area analysis unit 26 refers to the display component information 903 defined for each function to calculate the display data length, in particular, the vertical width Lt of the display data (step S101).

Then, the determination unit 27 determines whether the vertical width Lt of the display data is larger than a vertical width Ld of the display area (step S102). The determination unit 27 acquires the vertical width Ld of the display area from the screen size information 904.

When determining that the vertical width Lt is larger than the vertical width Ld of the display area (step S102: Yes), the determination unit 27 determines whether a difference between Lt and Ld is less than a threshold value Th (step S103). The threshold value Th is defined in advance in the threshold value information 905.

For example, a system administrator or the like may set the threshold value Th to a value that is relatively large when a user who uses the image forming apparatus 20 is able to easily distinguish fine characters used for the text, or may set the threshold value Th to a value that is relatively small when the user has difficulty to distinguish fine characters used for the text. In this manner, the system administrator or the like sets a determination criterion for determining whether each display component is displayed with a reduced size or with a standard length without changing, according to the user.

When the determination unit 27 determines that the difference between Lt and Ld is not less than the threshold Th (step S103: No), the image forming apparatus 20 ends the adjustment process. In this case, because the display data length is not adjusted, each display component is displayed with the corresponding standard length.

When the determination unit 27 determines that the difference between Lt and Ld is less than the threshold Th (step S103: Yes), the display control unit 28 reduces the display components at a substantially same ratio within a range in which any one of the display components does not have the vertical width less than the minimum vertical width (step S104). That is, the minimum limit (lower limit) of the range for the reduction is that any one of the display components has a size corresponding to the corresponding minimum vertical width. The substantially same ratio indicates the same ratio or a ratio close to the same ratio. The display control unit 28 reduces each main component in the vertical direction, that is, by changing the aspect ratio, within a range not less than the minimum value of the vertical width. Then, the display control unit 28 reduces each sub component without changing the aspect ratio in a manner that the lower limit of the size of the sub component is not less than the minimum value.

In this way, the vertical width of each display component (main component) is reduced by reducing the main component and the sub component using corresponding one of the methods that are different from each other so that a shape of the defined text or the defined image does not change, namely the defined text or the defined image does not lose its shape.

Then, the display area analysis unit 26 calculates the vertical width Lt of the display data including the reduced display components and then determines whether Lt is equal to Ld (Lt=Ld) (step S105). For example, when a determination result obtained after reducing the display components in a manner that one of the display components has the minimum value of the vertical length indicates that Lt is still greater than Ld (Lt>Ld), the determination unit 27 determines that Lt is not to be equal to Ld, namely determines that Lt=Ld is not satisfied. When the determination unit 27 determines that Lt=Ld is not satisfied (step S105: No), the image forming apparatus 20 ends the adjustment process. In this case, because the display data length is not adjusted, each display component is displayed with the corresponding standard length.

Reducing the display components when Lt=Ld is not satisfied does not change the situation in which the display data does not fit within the display area, and the scroll bar 120 is to be displayed. That is, this does not improve the noticeability. Accordingly, in the present embodiment, each display component is reduced when Lt=Ld is satisfied.

When the determination unit 27 determines that Lt=Ld is satisfied (step S105: Yes), the display control unit 28 updates the display data with the display components that are reduced (step S106). Then, the image forming apparatus 20 ends the adjustment process. When the determination unit 27 determines that the vertical width Lt of the display data is not greater than the vertical width Ld of the display area in S102 (step S102: No), the determination unit 27 further determines whether the vertical width Lt of the display data is less than the vertical width Ld of the display area (step S107).

When the determination unit 27 determines that the vertical width Lt of the display data is not less than the vertical width Ld of the display area (step S107: No), in this case, Lt is equal to Ld (Lt=Ld) and the display area is not required to be adjusted, the image forming apparatus 20 ends the adjustment process.

When the determination unit 27 determines that the vertical width Lt of the display data is less than the vertical width Ld of the display area (step S107: Yes), the display control unit 28 enlarges each of the display components at a substantially same ratio within a range in which any of the display component does not have the vertical width that exceeds the maximum vertical width (step S108). The substantially same ratio indicates the same ratio or a ratio close to the same ratio. The display control unit 28 enlarges each main component in the vertical direction in a manner that the vertical width does not exceed the maximum value, that is, enlarges each main component by changing the aspect ratio. Then, the display control unit 28 enlarges each sub component without changing the aspect ratio in a manner that an upper limit is the maximum value of the size of the sub component.

In this way, the vertical width of each display component (main component) is enlarged by enlarging the main component and the sub component using corresponding one of the methods that are different from each other so that a shape of the defined text or the defined image does not change, namely the defined text or the defined image does not lose its shape.

In the case of enlargement, whether to enlarge with Lt=Ld is not determined. This is because the noticeability is considered to be improved without enlarging the display data to the full display area.

Subsequently, the display control unit 28 updates the display data with each enlarged display component (step S109). Then, the image forming apparatus 20 ends the adjustment process.

When the image forming apparatus 20 performs the above-described adjustment process after the user setting is changed by a user operation, whether to perform the adjustment process may be selected by a user operation of selection operation. For example, the determination unit 27 of the image forming apparatus 20 displays a message indicating that the display date is adjustable on the operation panel 226 before the processing step S104 or the processing of step S108 of the adjustment process. Then, the determination unit 27 receives a selection operation indicating whether to perform the adjustment process.

Before starting the adjustment process, the determination unit 27 may receive a selection result indicating whether to adjust the display data. Then, as a result of the determination of step S103 or step S105 in the adjustment process, when each display component is not reduced (step S103: No or step S105: No), the determination unit 27 may display a message indicating that the adjustment process is failed to be performed.

Each of the determinations of step S103 and step S105 of the adjustment process is also regarded as processing of determining whether the difference between the vertical width Lt of the display data and the vertical width Ld of the display area is within a range in which the display component is not to be too small. Accordingly, the image forming apparatus 20 may perform both of these determinations as described above or may perform one of these determinations.

Figure 9A:
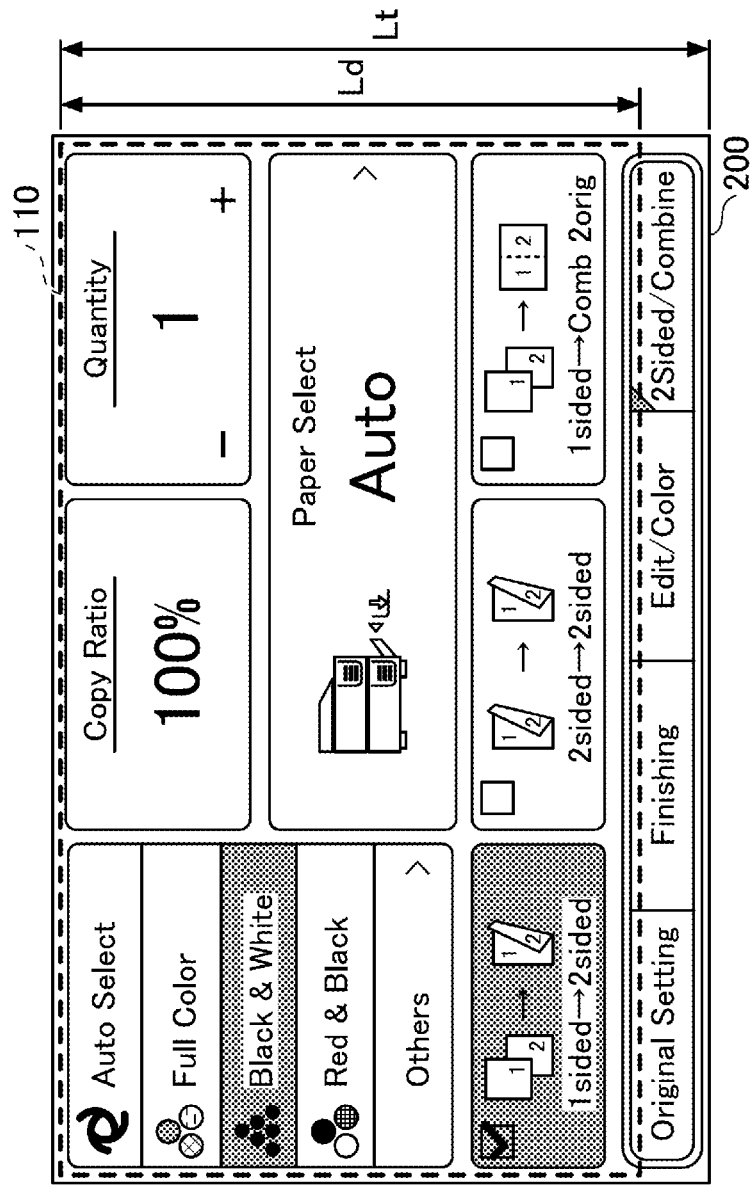
FIG. 9A, FIG. 9B, and FIG. 9C are diagrams each illustrating display data and display area, according to one or more embodiments.
Figure 9B:
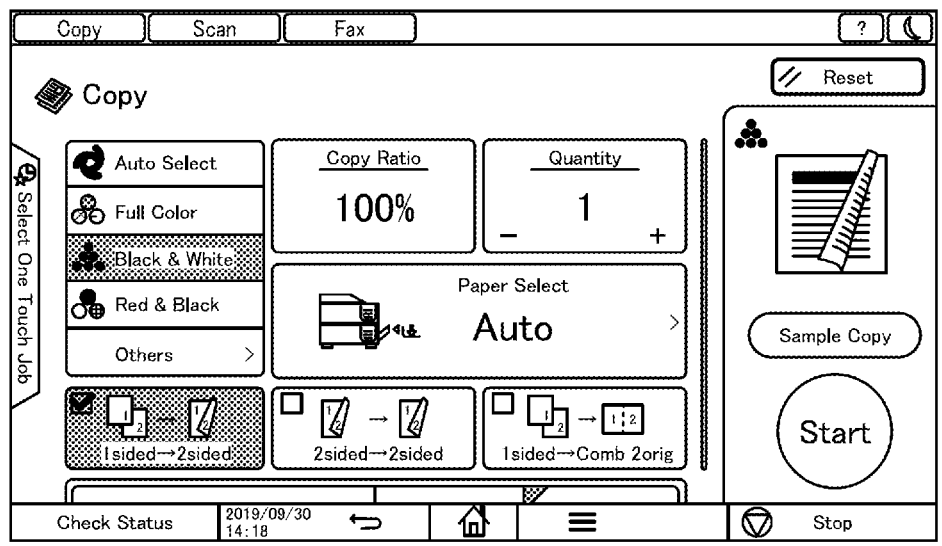
Figure 9C:
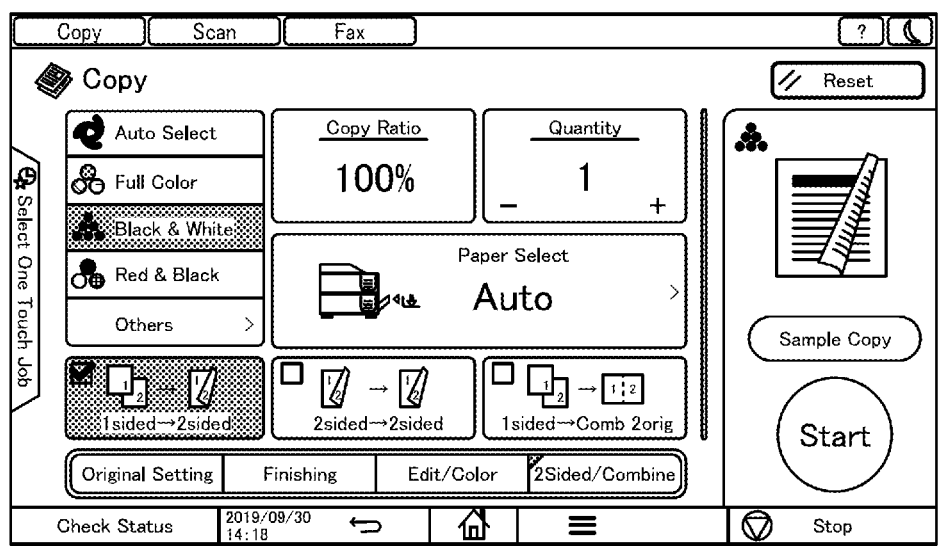

FIG. 9A, FIG. 9B, and FIG. 9C are diagrams each illustrating display data and display area, according to the present embodiment.

FIG. 9A is an illustration of the display data 200 that is slightly larger than the display area 110. In case where the adjustment process is not performed on the display data 200, which is slightly larger than the display area 110, one or more display components included in the display data 200 are displayed in a manner that a part of each of the one or more display components is cut off at the lower end of the display area 110, and the scroll bar 120 is displayed, as illustrated in FIG. 9B, which is an illustration of a related art.

On the other hand, when the adjustment process according to the present embodiment is performed, each display component that is reduced, or having a reduced size, is displayed such that the display data fits within the display area 110, and the scroll bar 120 is not displayed, as illustrated in FIG. 9C.

In addition, in a case where the display data 200 includes more number of display components than those illustrated in FIG. 9A according to user settings or the connection status of the external device 30, since the display components are not reduced even when the adjustment process is performed, the display components are displayed with the standard length as is conventionally displayed. In this case, some of the display components are displayed in a manner that a part of each display component is cut off at the lower end of the display area 110, and the scroll bar 120 is displayed. This facilitates a user to recognize or know that more display components are under these display components, which are displayed with the parts cut off.

Performing the adjustment process according to the present embodiment when a number of display components are included in the display data 200 allows the user to recognize that more display components are included below. When the vertical width Lt of the display data 200 is slightly longer than the vertical width Ld of the display area 110 as illustrated in FIG. 9A, each display component is displayed with a reduced size so that the display data is displayed within the display area 110. Accordingly, the display components are reduced while operability or noticeability is maintained.

Figure 10A:
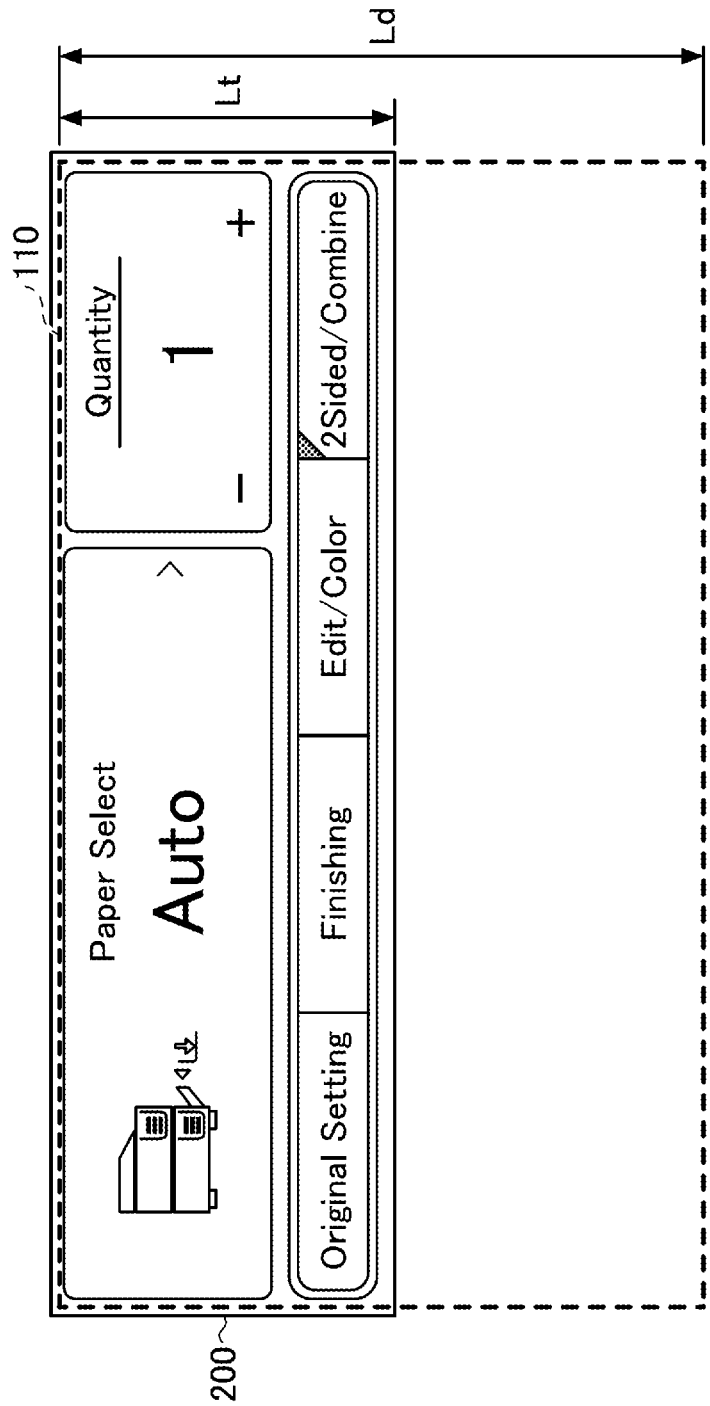
FIG. 10A, FIG. 10B, and FIG. 10C are diagrams each illustrating display data and display area, according to one or more embodiments.
Figure 10B:
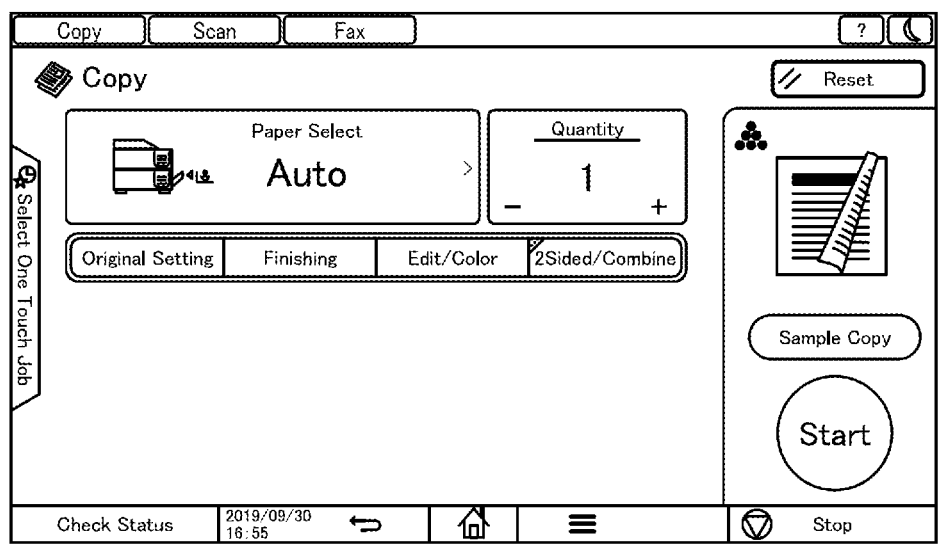
Figure 10C:
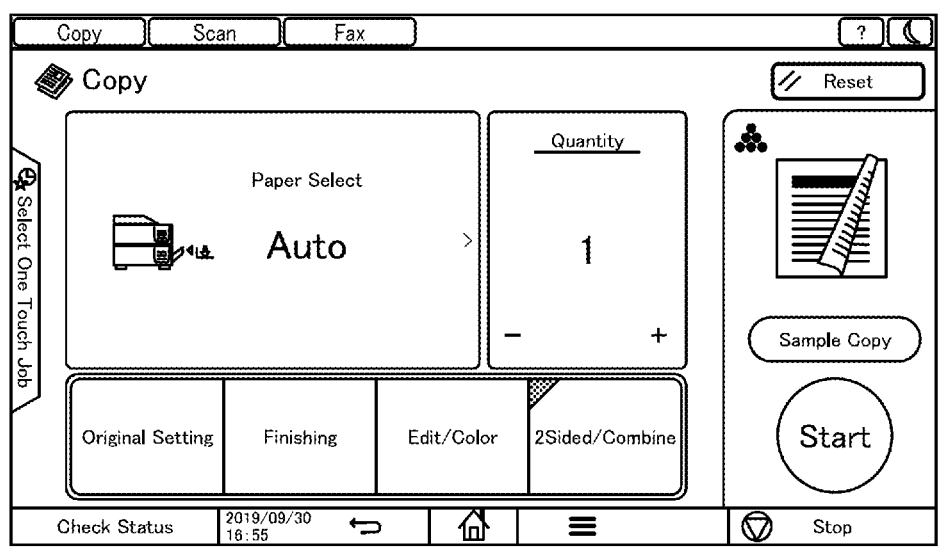

FIG. 10A, FIG. 10B, and FIG. 10C are diagrams each illustrating display data and display area, according to the present embodiment.

FIG. 10A is an illustration of the display data 200 that is smaller than the display area 110. In case where the adjustment process is not performed on the display data 200, which is smaller than the display area 110, a margin is included at the lower end of the display area 110 as illustrated in FIG. 10B, which also illustrates a related art.

On the other hand, when the adjustment process according to the present embodiment is performed, each display component is enlarged and displayed as illustrated in FIG. 10C. In this manner, the display area 110 is utilized without waste, and operability or noticeability is further improved.

Second Embodiment

A description is now given of a second embodiment of the present disclosure, with reference to drawings. The second embodiment is different from the first embodiment in that the display components of display data are classified into a plurality of groups (classification groups) and reduced or enlarged for each group. In the following description of the second embodiment, the difference from the first embodiment is focused. In the following description, the same reference numerals are given to the same or corresponding functions or configurations as those of the first embodiment, and the redundant descriptions are omitted or simplified appropriately.

FIG. 11A and FIG. 11B are diagrams each illustrating an example of display component information according to the second embodiment.

The main component information 903a of the display component information according to the present embodiment includes "GROUP NO" as a data item.

The value of the data item of "GROUP NO." is a value obtained by classifying the display components (main components) into a plurality of classification groups and is also a value indicating priority in an order of priority in relation to the process.

Figure 12:
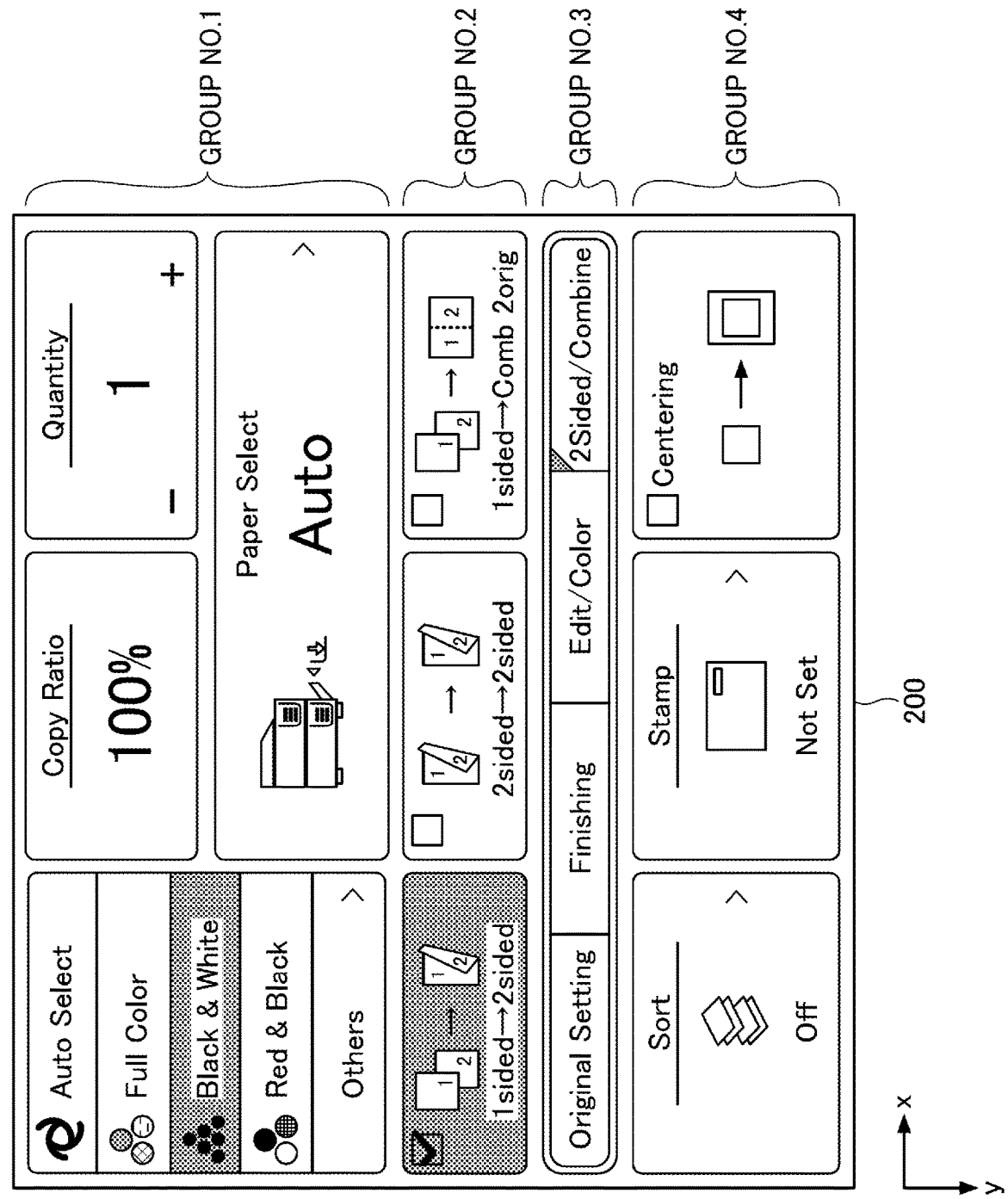
FIG. 12 is a diagram illustrating display data including display components classified into a plurality of groups according to one or more embodiments.

FIG. 12 is a diagram illustrating display data including display components classified into a plurality of groups according to the second embodiment.

Each display component is classified as one of the plurality of groups according to the display position. For example, the value of the data item of "GROUP NO" of a display component included in a group that includes the display components positioned at the uppermost of the display data 200 is 1, and values such as 2, 3, and 4 are assigned to the respective rows in order from the group at the uppermost to bottom.

In this example, since reduction or enlargement is performed for each group by a process, which is described later, grouping (classification) is performed for each row so that the layout is maintained. In addition, since the layout of the display data 200 is often designed such that a frequently used display component is arranged in an upper display area. Accordingly, in the example given in the description of the present embodiment, values are assigned by taking into account the priority in the order of priority in relation to the process. However, the method of classifying the display components is not limited thereto, and the display components may be classified in any manner.

Figure 13:
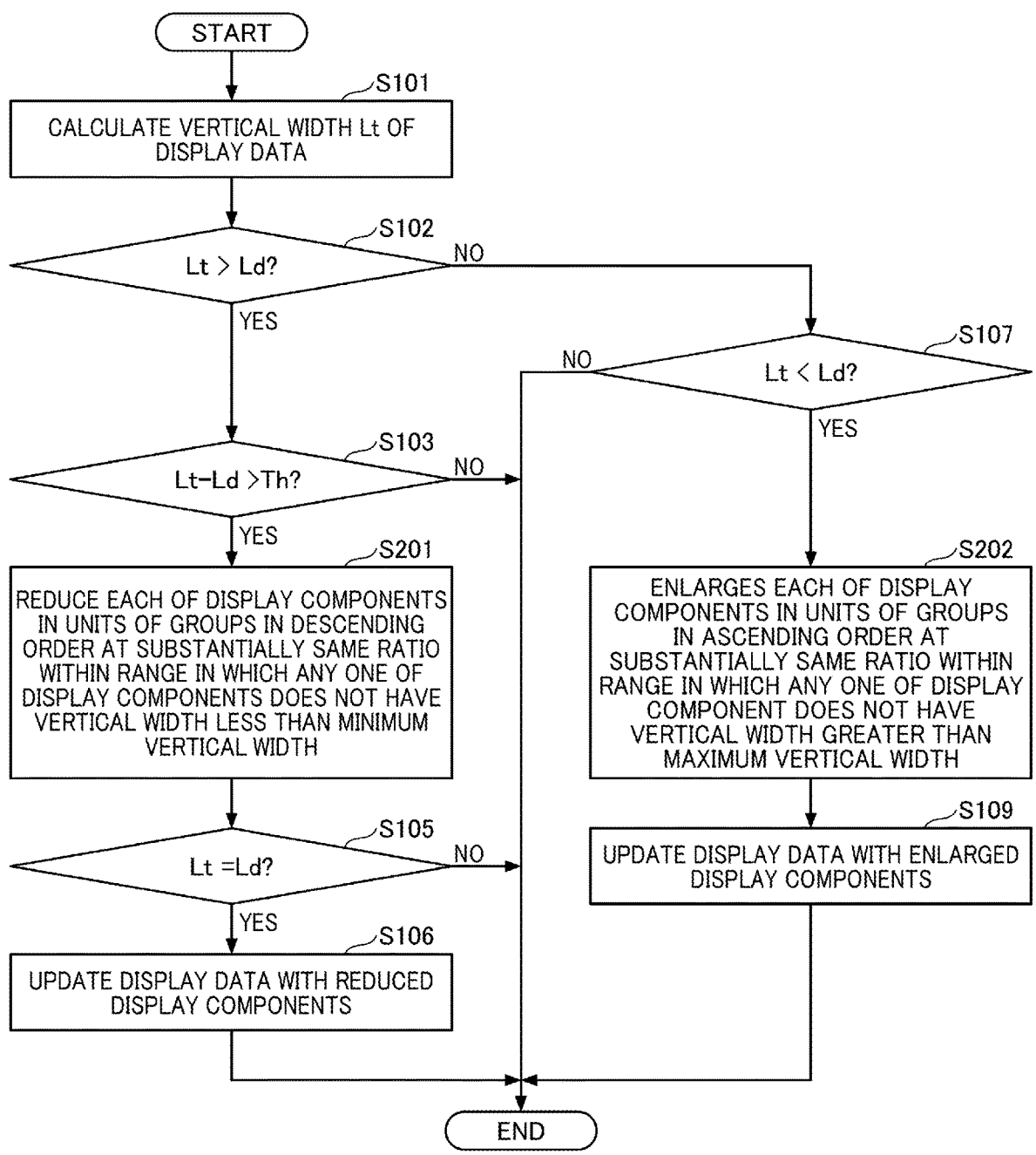
FIG. 13 is a flowchart illustrating another example of an adjustment process according to one or more embodiments.

FIG. 13 is a flowchart illustrating an example of an adjustment process according to the first embodiment.

In the adjustment process according to the present embodiment, in alternative to the processing of step S104 of the adjustment process according to the first embodiment, the display control unit 28 reduces the display components for each group, namely in units of groups, in descending order at a substantially same ratio within a range in which any one of the display components does not have the vertical width less than the minimum vertical width (step S201). The substantially same ratio indicates the same ratio or a ratio close to the same ratio. According to the classification illustrated in FIG. 12, the descending order starts a group that is positioned at the bottom on the display data and of which a value of "GROUP NO." is the largest.

For example, the display control unit 28 reduces the display components in a group that has the largest value of item of "GROUP NO.", "4", at a substantially same ratio, which indicates the same ratio or a ratio close to the same ratio. Then, when Lt=Ld is not satisfied even when the vertical width of any of the display components in the group becomes the minimum value, the display control unit 28 next reduces the display components belonging to a group having a value of "3" that is the second largest value of the item of "GROUP NO." at a substantially same ratio, which indicates the same ratio or a ratio close to the same ratio. In this way, the display control unit 28 performs the processing of step S201 until Lt=Ld is satisfied or the processing is performed for all the groups.

Accordingly, in the processing of step S201, the larger the value of item of "GROUP NO." to which a display component belongs to is, the higher the priority in relation to the process for the reduction is given to the display component.

Similarly, in alternative to the processing of step S108 in the adjustment process according to the present embodiment, the display control unit 28 enlarges the display components at a substantially same ratio, which indicates the same ratio or a ratio close to the same ratio, for each group (in the units of groups) in an ascending order within a range in which any one of the display components does not have vertical width greater than the maximum value of the vertical width (step S202). According to the classification illustrated in FIG. 12, the ascending order starts a group that is positioned at the top on the display data and of which a value of "GROUP NO." is the smallest.

For example, the display control unit 28 enlarges each of the display components in a group that has the smallest value of item of "GROUP NO.", "1", at a substantially same ratio, which indicates the same ratio or a ratio close to the same ratio. Then, when Lt=Ld is not satisfied even when the vertical width of any of the display components in the group becomes the maximum value, the display control unit 28 next enlarges the display components belonging to a group having a value of "2" that is the second smallest value of the item of "GROUP NO." at a substantially same ratio, which indicates the same ratio or a ratio close to the same ratio. In this way, the display control unit 28 performs the processing of step S202 until Lt=Ld is satisfied or the processing is performed for all the groups.

Accordingly, in the processing of step S202, the smaller the value of item of "GROUP NO." to which a display component belongs to is, the higher the priority in the order of priority in relation to the process for the enlargement is given to the display component.

The adjustment process according to the present embodiment is substantially the same as the adjustment process according to the first embodiment except for the above-described processing.

According to the image forming apparatus 20 of the present embodiment, the display components are reduced or enlarged, at a substantially same ratio, which indicates the same ratio or a ratio close to the same ratio, for each group, or in the units of groups. With the above-described configuration, the display components are reduced group by group in order start from a group of less frequently used display components arranged in a lower part according to the classification of the display components. Accordingly, the frequently used display components are displayed larger than the less frequently used display components. Accordingly, noticeability or operability is improved by adjustment in accordance with the use frequency of the display components. In addition, when the display components are classified, for example, in units of rows, the layout is preventable from being changed, namely is maintainable.

In each of the above-described embodiments, an example in which the display data is scrolled in the up-down direction, that is, in the vertical direction has been described, but this is not limiting. For example, the display data may be scrolled in the horizontal direction. In this case, the substantially same processing in the above-described embodiments are performable by replacing words used for expressing in relation to physical positions, "vertical" "upper/top," and "lower/bottom" with "horizontal," "left," and "right," respectively, for example. Even when the display data is switched for each page instead of being scrolled, the image forming apparatus 20 is able to perform the processing described in each of the above-described embodiments.

The apparatuses or devices described in the embodiments described above are merely one example of plural computing environments that implement one or more embodiments of the disclosure. In some embodiments, the image forming apparatus 20 includes multiple computing devices, such as a server cluster. The plurality of computing devices is configured to communicate with one another through any type of communication link, including a network, shared memory, etc., and perform the processes disclosed herein.

Each of the functions of the described embodiments may be implemented by one or more processing circuits or circuitry. Here, the "processing circuit or circuitry" in the present disclosure includes a programmed processor to execute each function by software, such as a processor implemented by an electronic circuit, and devices, such as an application specific integrated circuit (ASIC), a digital signal processors (DSP), a field programmable gate array (FPGA), and conventional circuit modules arranged to perform the recited functions.

Further, in each of the above-described embodiments, the image forming apparatus 20 is used as an example of a display device. The display device is not limited to the image forming apparatus as long as the display device has a display function. The display device includes, for example, projectors (PJ), output devices such as digital signages, remote conferencing terminals, head up display (HUD) devices, industrial machines, medical devices, network home appliances, connected cars, notebook personal computers (PCs), mobile phones, tablet terminals, game machines, personal digital assistants (PDAs), digital cameras, spherical panoramic image capturing devices, wearable PCs, and desktop PCs.

Further, an application program installed on the image forming apparatus 20 may be installed on an information processing device including a PC, a mobile terminal, and a smartphone, which are owned by a user. Accordingly, the above-mentioned operation unit 22 may be provided separately from the image forming apparatus 20.

Although the description above is given based on each of the above-described embodiments, the present disclosure is not limited to the requirements described in the above embodiments. In regard to these points, the configuration can be modified without departing from the spirit of the present disclosure, and can be appropriately set according to an applied configuration.

In conventional arts, even when a length of display data (display data length) is slightly longer than a length of display area (display area length) of a screen, display components are displayed in a manner that a part of each of one or more of the display components is cut off to be displayed. In conventional arts, an operation such as scrolling is required to check or select a display component that is out of display area or displayed with a part of the display component cut off, resulting in low noticeability or low operability. To cope with this, each display component may be reduced such that the display data is displayed within the display area. However, if each display component reduced to be too small, the noticeability or the operability is reduced.

According to the above described embodiments, each of the display components is reduced while preventing reducing the noticeability or the operability.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. A display device, comprising
circuitry configured to determine, based on a display data length and a display area length, whether display data including one or more display components fits within a display area of a screen on which the display data is to be displayed,
wherein, in case that a determination result indicates that a part of the display data is out of the display area, the circuitry is further configured to display the display data including the one or more display components that are reduced based on a difference between the display data length and the display area length,
wherein, in the case that the determination result indicates that the part of the display data is out of the display area, the circuitry further:

determines whether the display data fits within the display area, under conditions that the one or more display components are reduced based on the difference between the display data length and the display area length and information including a minimum length corresponding to each of the one or more display components, in a range of which a minimum limit is that one of the one or more display components is reduced to have the minimum length corresponding to the one of the one or more display components; and displays the display data including the one or more display components that are reduced in response to determining that the display data fits within the display area under the conditions.

2. The display device of claim 1, wherein, in the case that the determination result indicates that the part of the display data is out of the display area, the circuitry further:

determines whether the difference between the display data length and the display area length is less than a threshold value; and displays the display data including the one or more display components that are reduced in response to determining that the difference between the display data length and the display area length is less than the threshold value.

3. The display device of claim 1, wherein each of the one or more display components, includes a main component or the main component and one or more sub components, the main component representing an outer shape of a corresponding one of the one or more display components, each of the one or more sub components representing one of text and an image to be displayed inside of the outer shape, wherein the circuitry further:

determines whether the display data fits within the display area under additional conditions that the main component of each of the one or more display components is reduced based on information including a first minimum length corresponding to the main component and a second minimum lengths each corresponding to one of the one or more sub components, in a range of which a minimum limit is that the main component is reduced to have the first minimum length; and displays the display data including the one or more display components that are reduced in response to determining that the display data fits within the display area under the additional conditions.

4. The display device of claim 1, wherein the one or more display components include a plurality of display components, and wherein, in the case that the determination result indicates that the part of the display data is out of the display area, the circuitry reduces the plurality of display components at a same ratio or a ratio close to the same ratio.

5. The display device of claim 1, wherein the one or more display components include a plurality of display components, and the plurality of display components are classified into a plurality of classification groups to which an order of priority is given, and wherein, in the case that the determination result indicates that the part of the display data is out of the display area, the circuitry reduces the plurality of display components in units of groups in the order of priority, based on information on the plurality of classification groups and the order of priority.

6. The display device of claim 1, wherein, in the case that the determination result indicates that the part of the display data is out of the display area, the circuitry further:

receives a user operation of selecting whether to reduce the one or more display components; and displays the display data including the one or more display components that are reduced in response to a selection result of the user operation indicating to reduce the one or more display components.

7. The display device of claim 1, wherein, in case that the display data length is less than the display area length, the circuitry displays the display data including the one or more display components that are enlarged.

8. The display device of claim 7, wherein the one or more display components include a plurality of display components, and wherein the circuitry further enlarges the plurality of display components at a same ratio or a ratio close to the same ratio.

9. The display device of claim 7, wherein the one or more display components include a plurality of display components, and the plurality of display components are classified into a plurality of classification groups to which an order of priority is given, and wherein the circuitry further enlarges the plurality of display components in units of groups in the order of priority, based on information on the plurality of classification groups and the order of priority.

10. The display device of claim 7, wherein each of the one or, more display components includes a main component or the main component and one or more sub components, the main component representing an outer shape of a corresponding one of the one or more display components, each of the one or more sub components representing one of text and an image to be displayed inside of the outer shape, and wherein the circuitry further enlarges the one or more sub components and the main component of each of the one or more display components while maintaining an aspect ratio of each of the one or more sub components based on information including a first maximum length corresponding to the main component and a second minimum lengths each corresponding to one of the one or more sub components.

11. The display device of claim 7, wherein the circuitry further:

receives a user operation of selecting whether to enlarge the one or more display components; and displays the display data including the one or more display components that are enlarged in response to a selection result of the user operation, indicating to enlarge the one or more display components.

12. The display device of claim 7, wherein the circuitry further:

receives a user operation of selecting whether to enlarge the one or more display components; and displays the display data including the one or more display components that are enlarged in response to a selection result of the user operation indicating to enlarge the one or more display components.

13. A display method, comprising:
  determining, in response to display data that includes one or more display components and that is out of a display area, whether the display data fits within the display area under conditions that the one or more display components are reduced based on:
    a difference between a display data length and a display area length; and
    information including a minimum length corresponding to each of the one or more display components, in a range of which a minimum limit is that one of the one or more display components is reduced to have the minimum length corresponding to the one of the one or more display components; and
  displaying, in response to determining that the display data fits within the display area under the conditions, display data including the one or more display components that are reduced.

14. A display device, comprising
  circuitry configured to determine, based on a display data length and a display area length, whether display data including one or more display components fits within a display area of a screen on which the display data is to be displayed,
  wherein, in case that a determination result indicates that a part of the display data is out of the display area, the circuitry is further configured to display the display data including the one or more display components that are reduced based on a difference between the display data length and the display area length,
  wherein, in case that, the display data length is less than the display area length, the circuitry displays the display data including the one or more display components that are enlarged,
  wherein each of the one or more display components includes a main component or the main component and one or more sub components, the main component representing an outer shape of a corresponding one of the one or more display components, each of the one or more sub components representing one of text and an image to be displayed inside of the outer shape, and
  wherein the circuitry further enlarges the one or more sub components and the main component of each of the one or more display components while maintaining an aspect ratio of each of the one or more sub components based on information including a first maximum length corresponding to the main component and a second minimum lengths each corresponding to one of the one or more sub components.

15. The display device of claim 14,
  wherein the one or more display components include a plurality of display components, and
  wherein the circuitry further enlarges the plurality of display components at a same ratio or a ratio close to the same ratio.

16. The display device of claim 15,
  wherein the one or more display components include a plurality of display components, and the plurality of display components are classified into a plurality of classification groups to which an order of priority is given, and
  wherein the circuitry further enlarges the plurality of display components in units of groups in the order of priority, based on information on the plurality of classification groups and the order of priority.

* * * * *